July 16, 1957 S. C. MOON 2,799,386
SELF-CONTAINED MOBILE POWER DRIVEN CONVEYER SYSTEM
Filed July 21, 1951 19 Sheets-Sheet 1

INVENTOR;
STERLING C. MOON,
BY
ATT'Y.

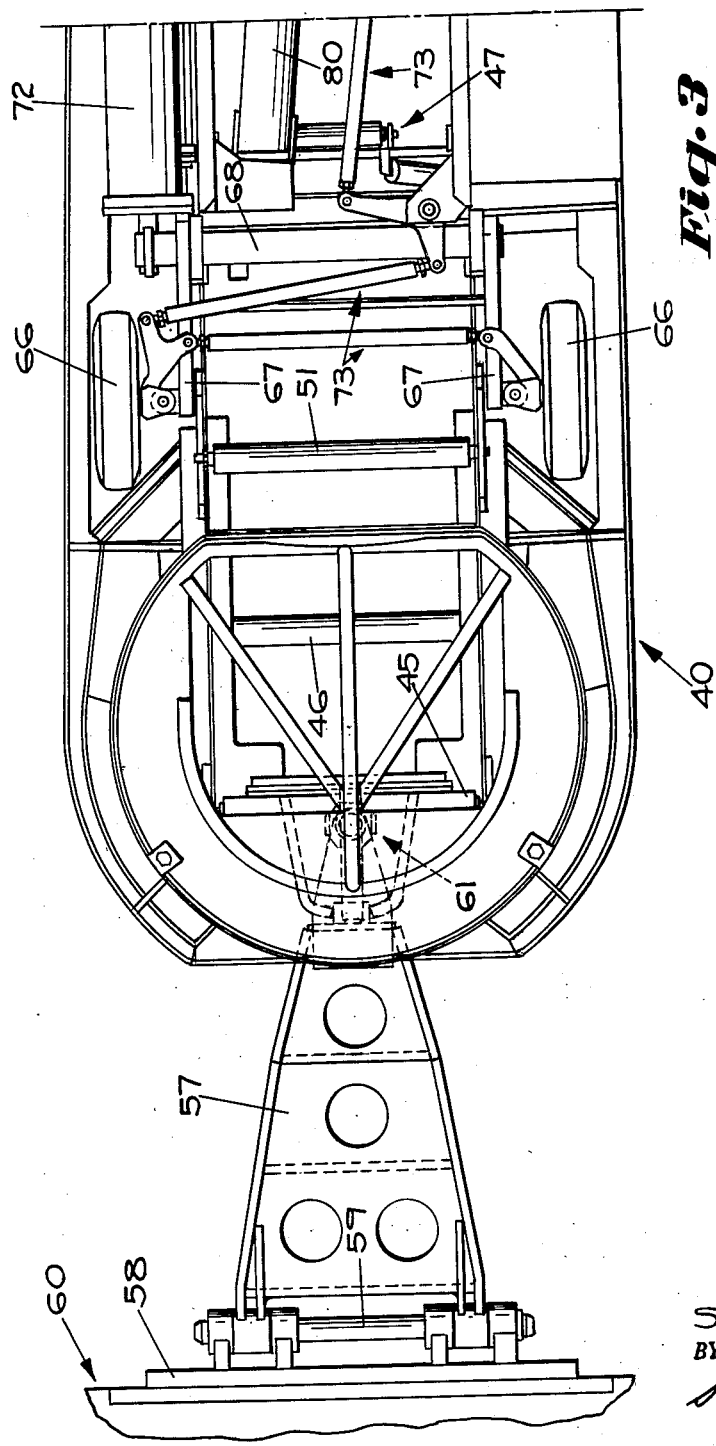

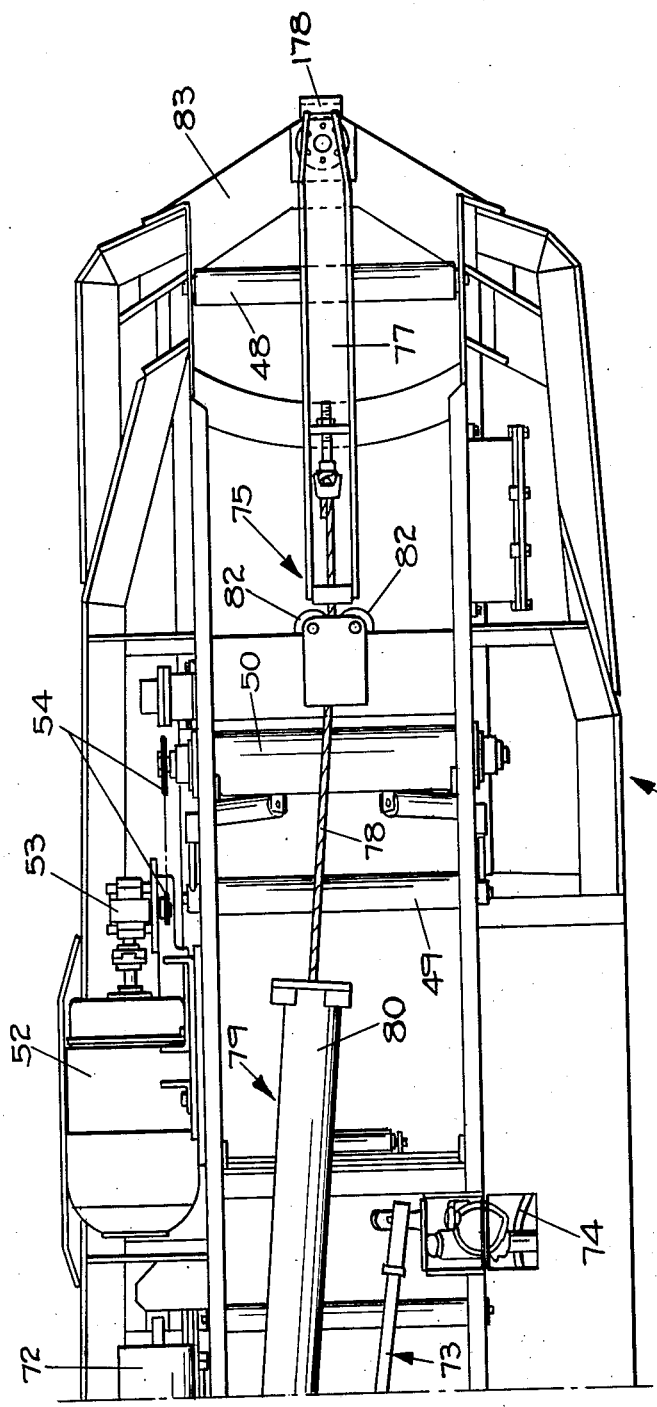

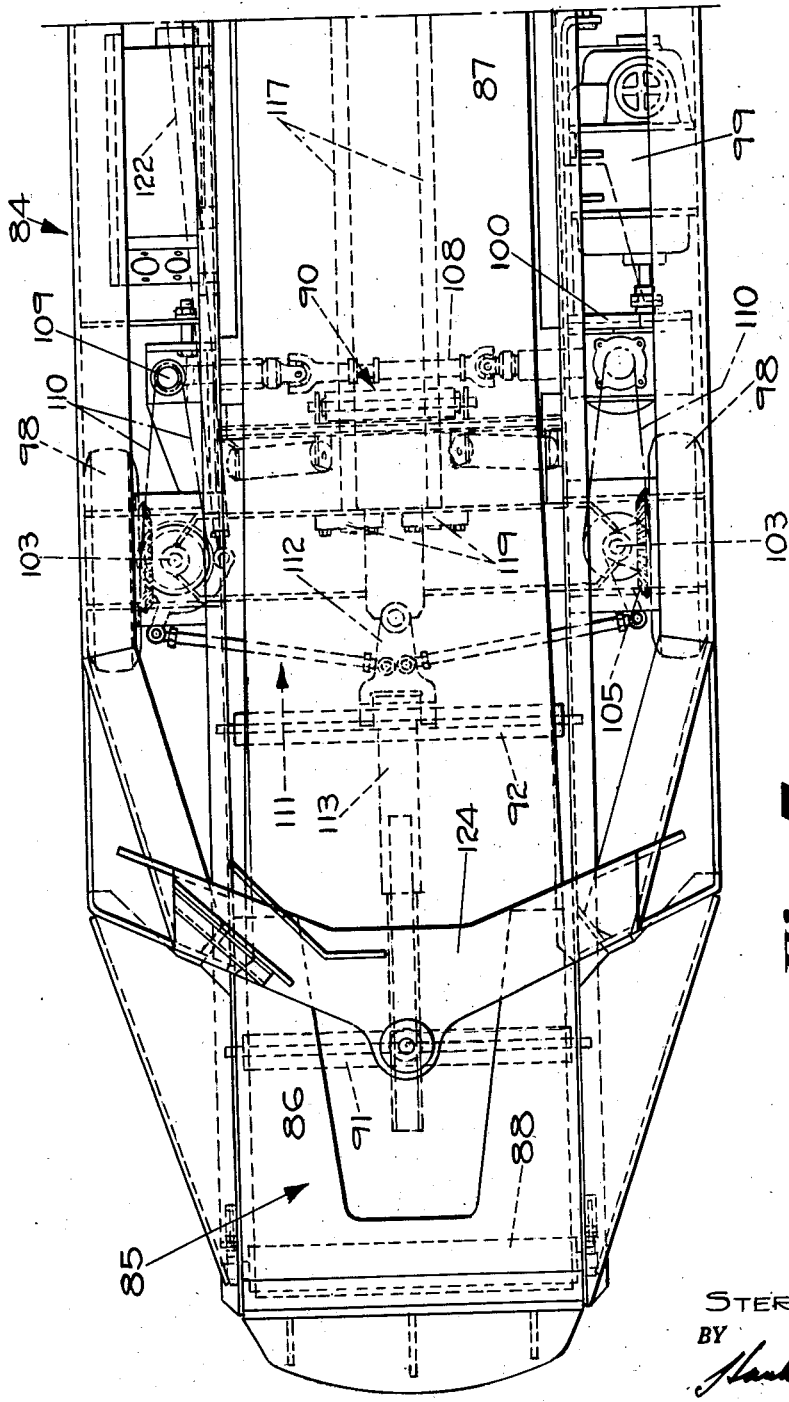

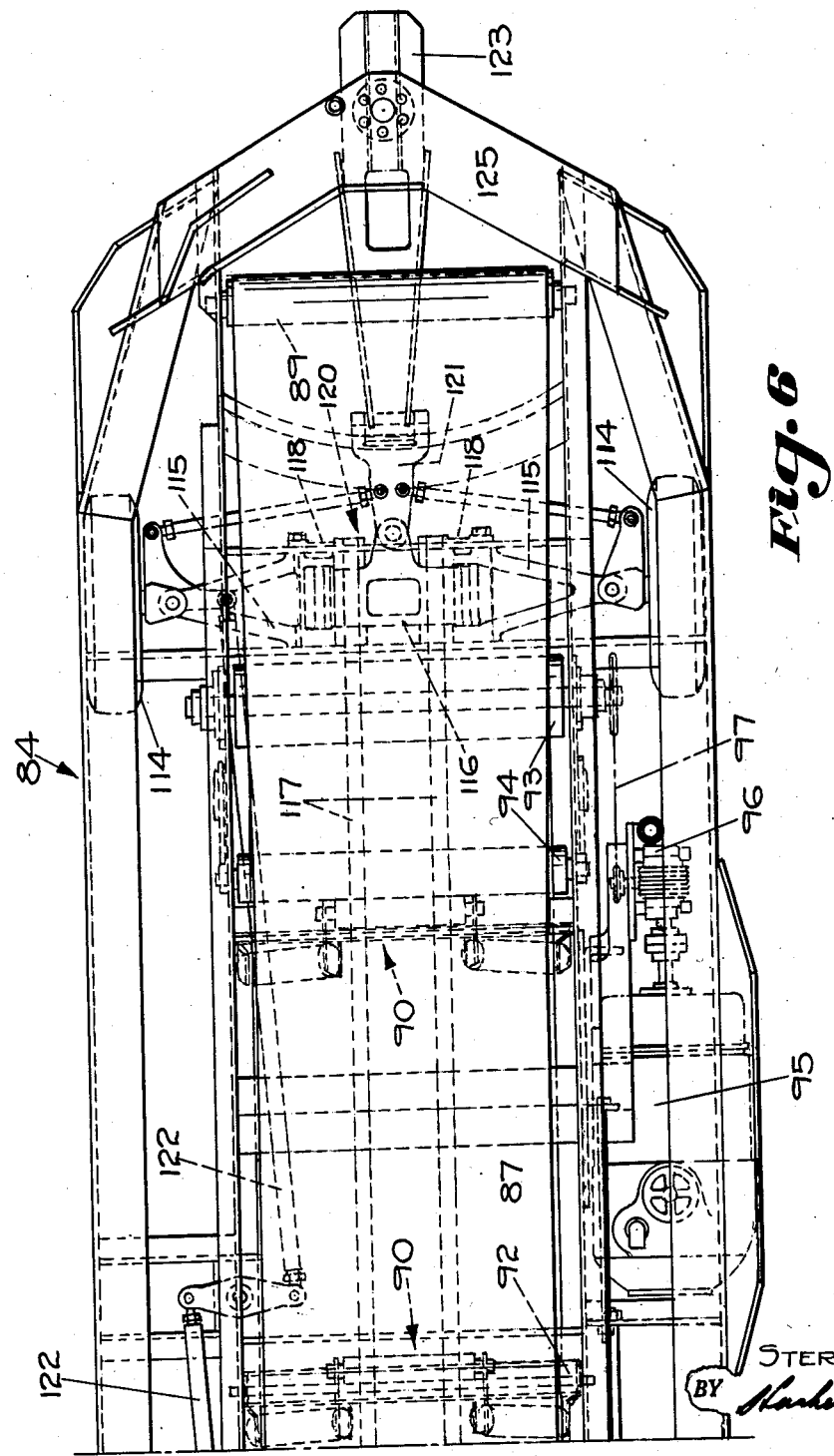

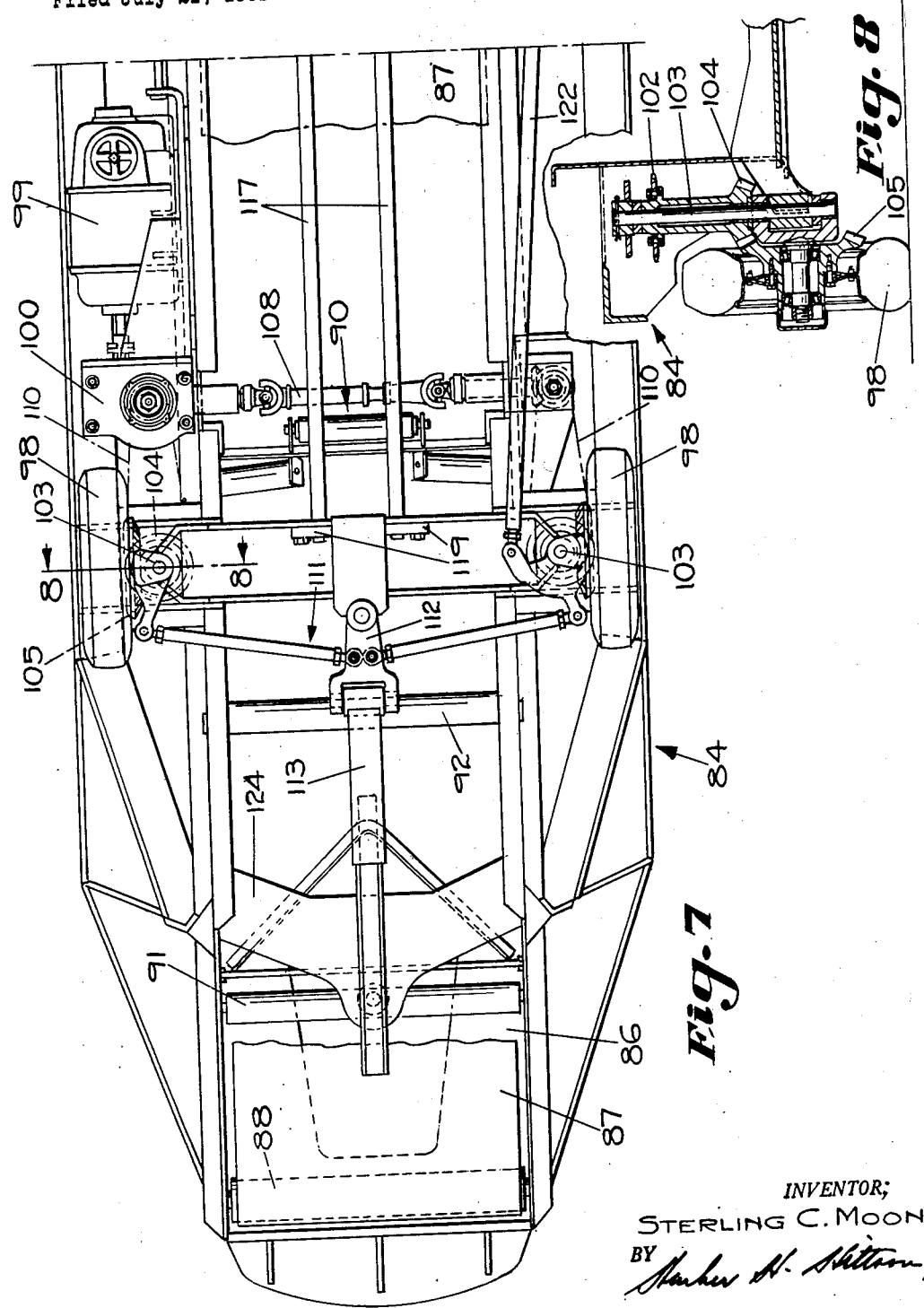

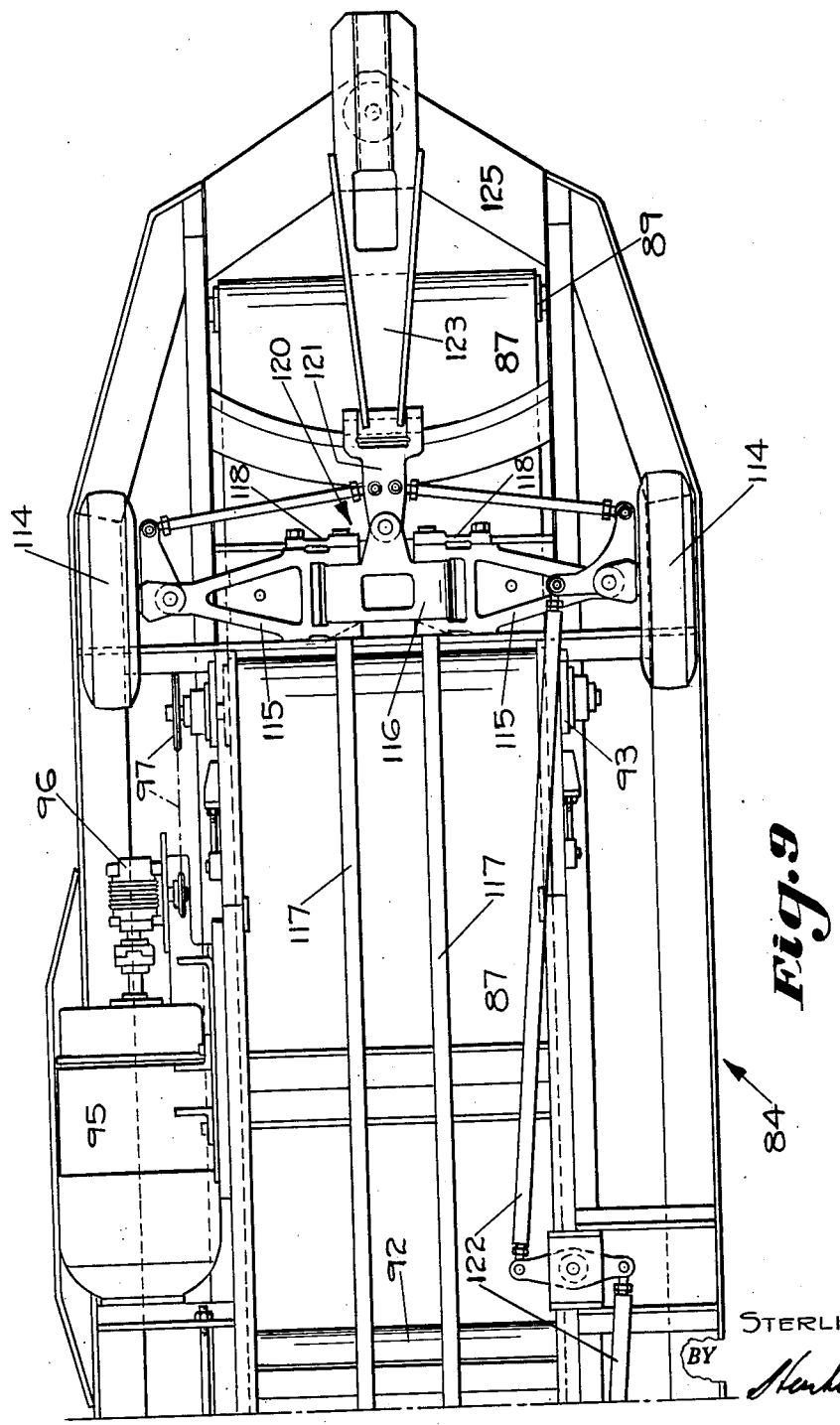

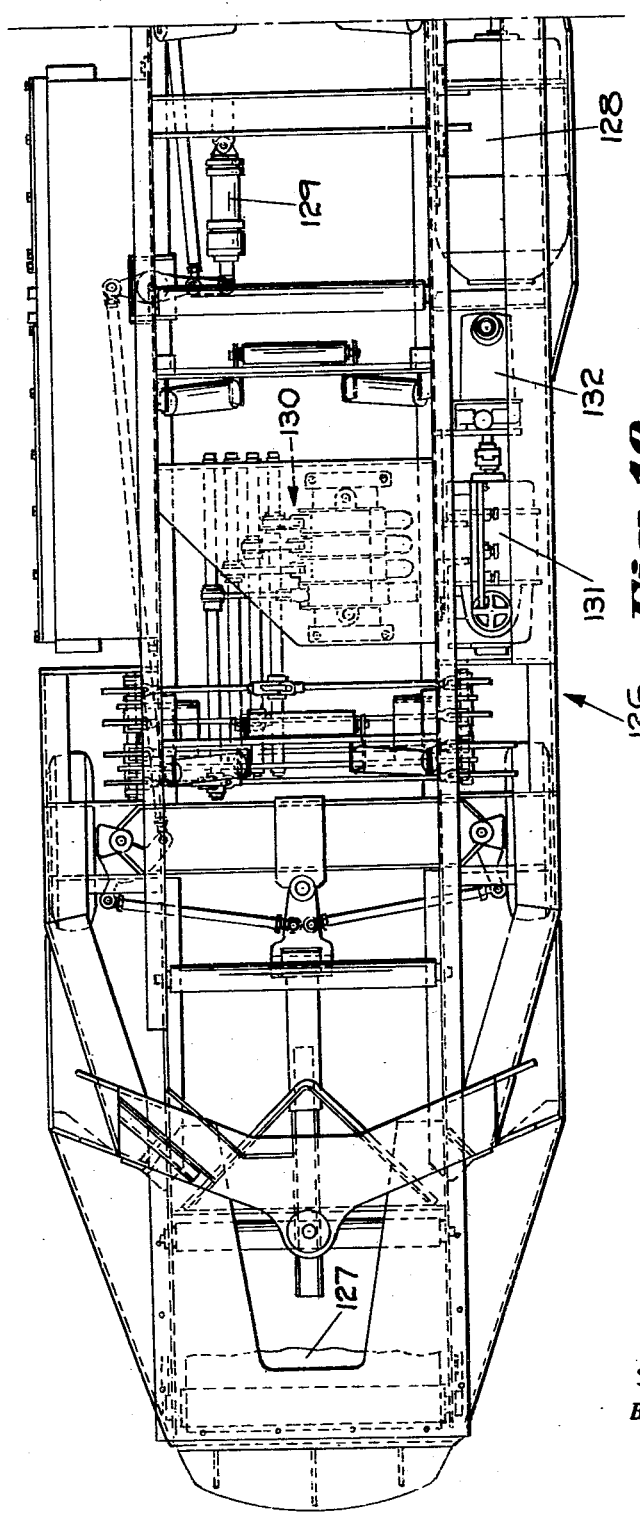

July 16, 1957        S. C. MOON        2,799,386
SELF-CONTAINED MOBILE POWER DRIVEN CONVEYER SYSTEM
Filed July 21, 1951        19 Sheets-Sheet 10

INVENTOR;
STERLING C. MOON,
BY
ATTY.

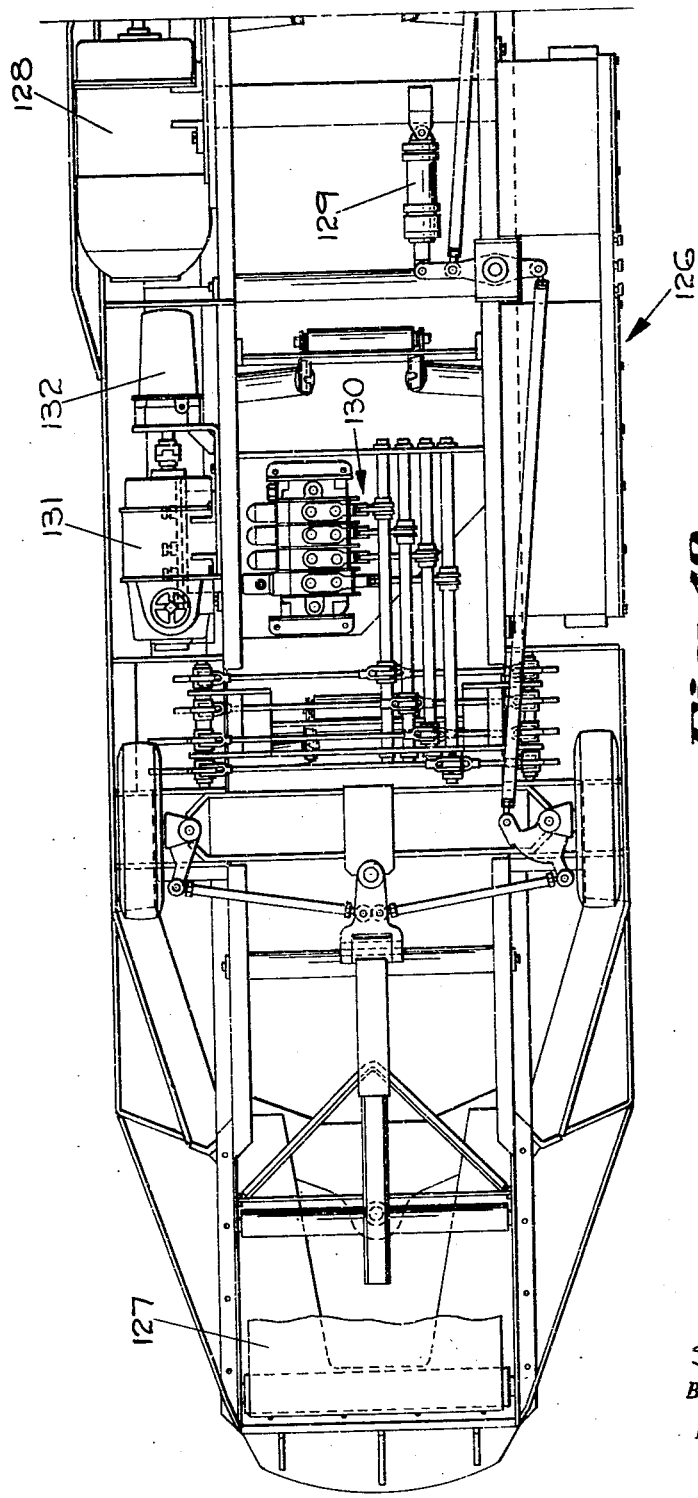

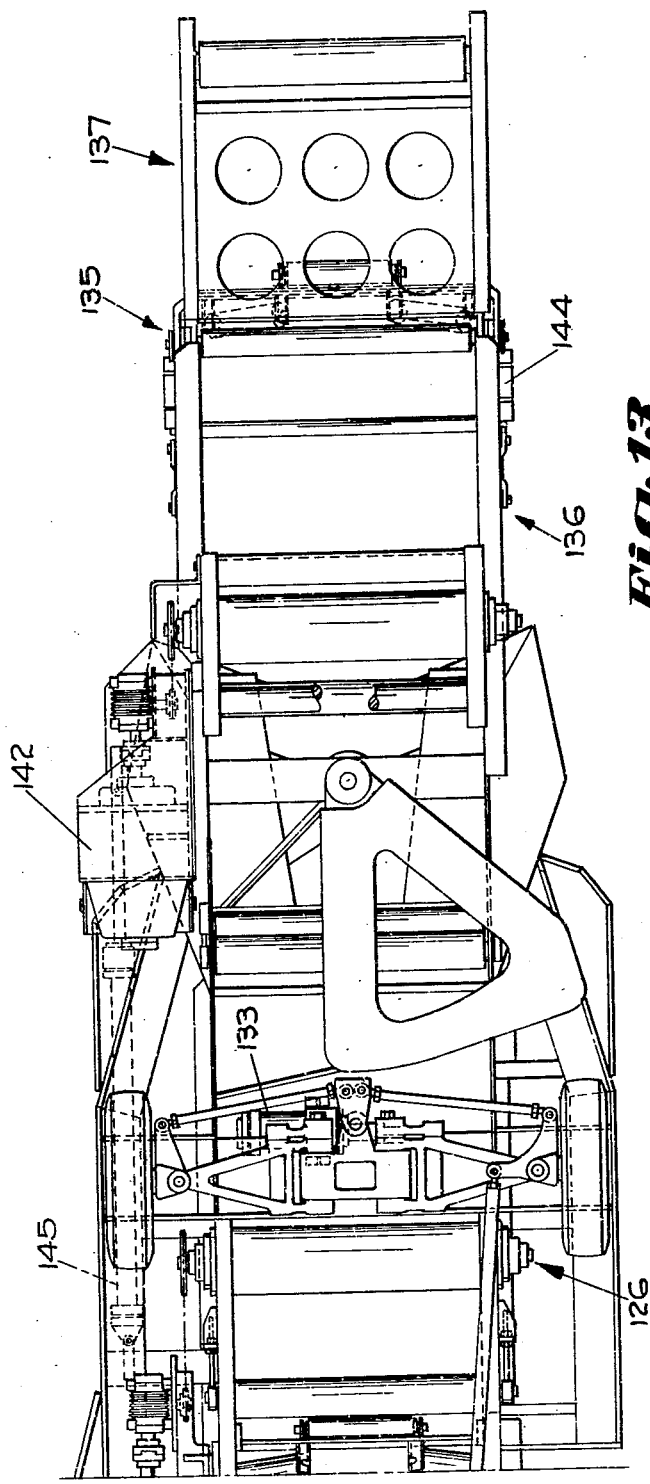

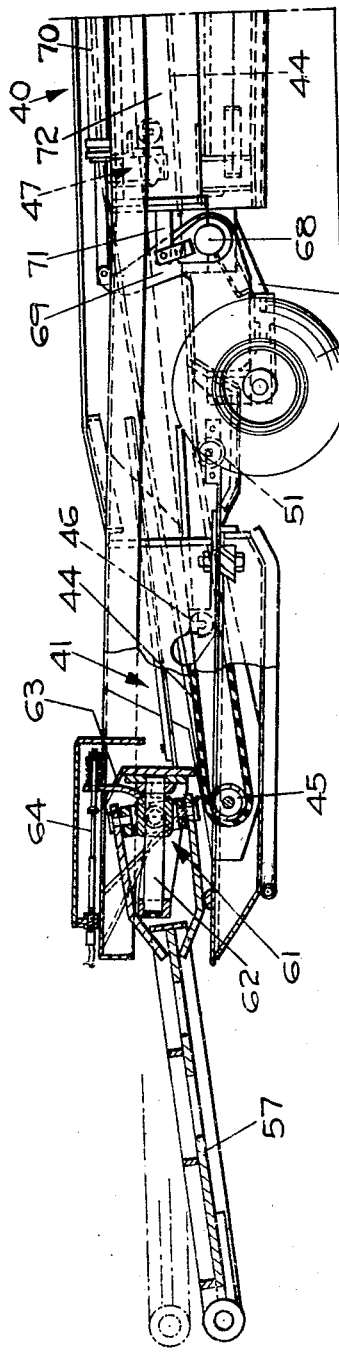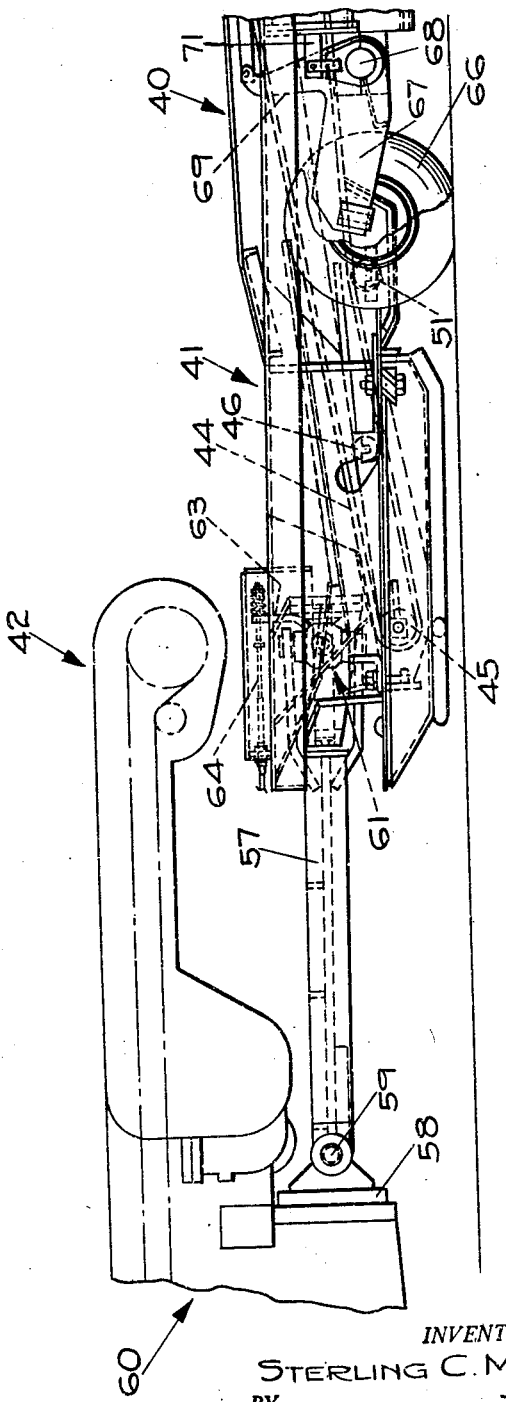

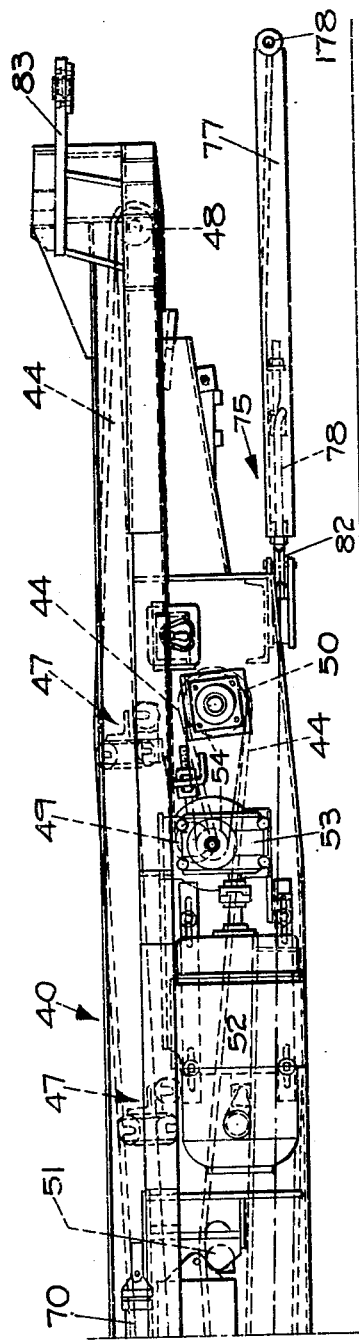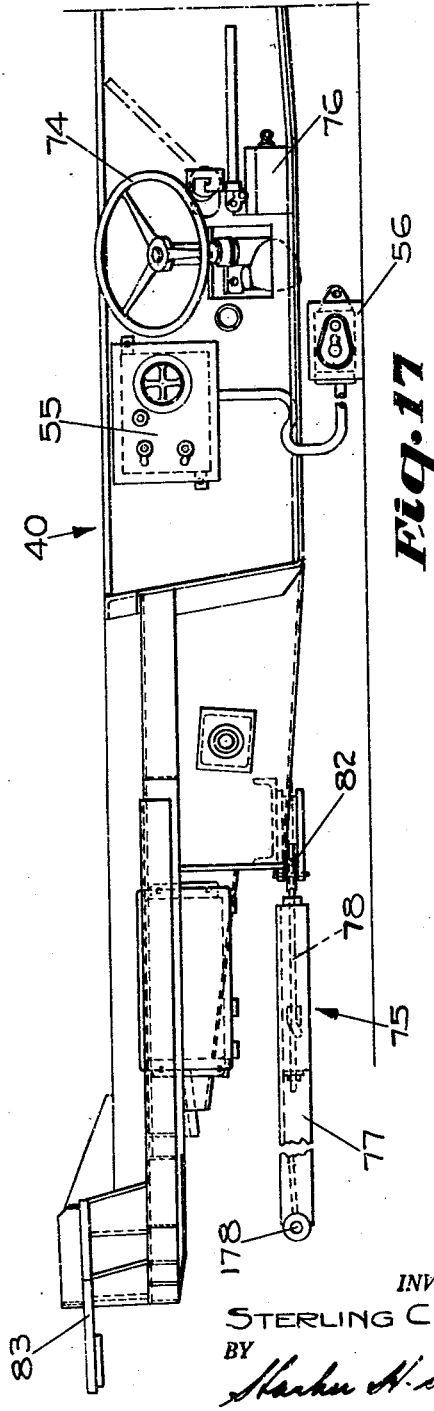

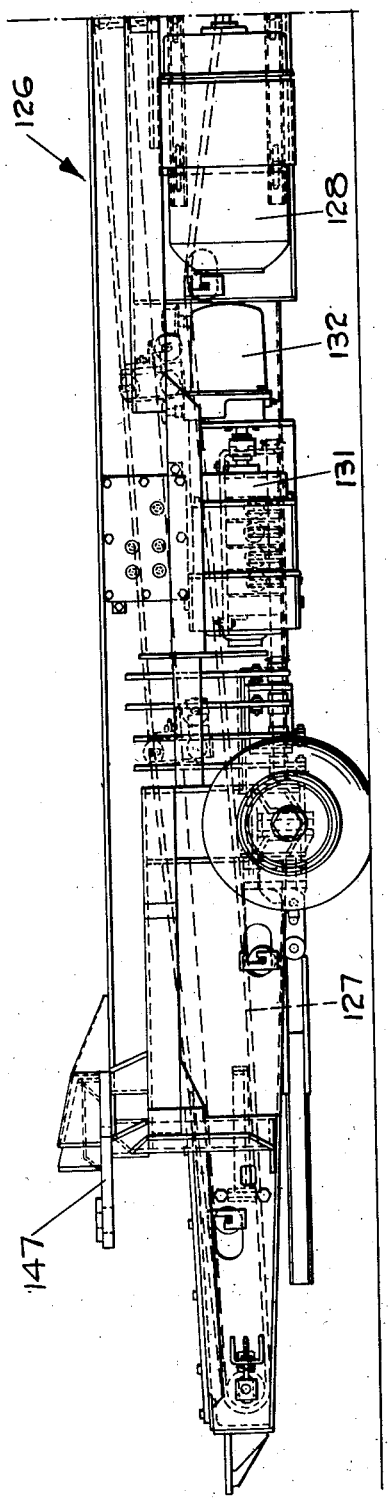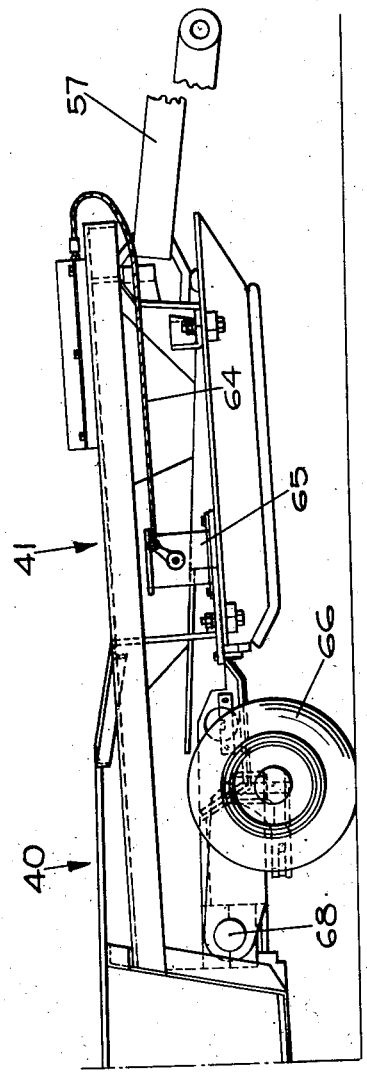

July 16, 1957 S. C. MOON 2,799,386
SELF-CONTAINED MOBILE POWER DRIVEN CONVEYER SYSTEM
Filed July 21, 1951 19 Sheets-Sheet 16
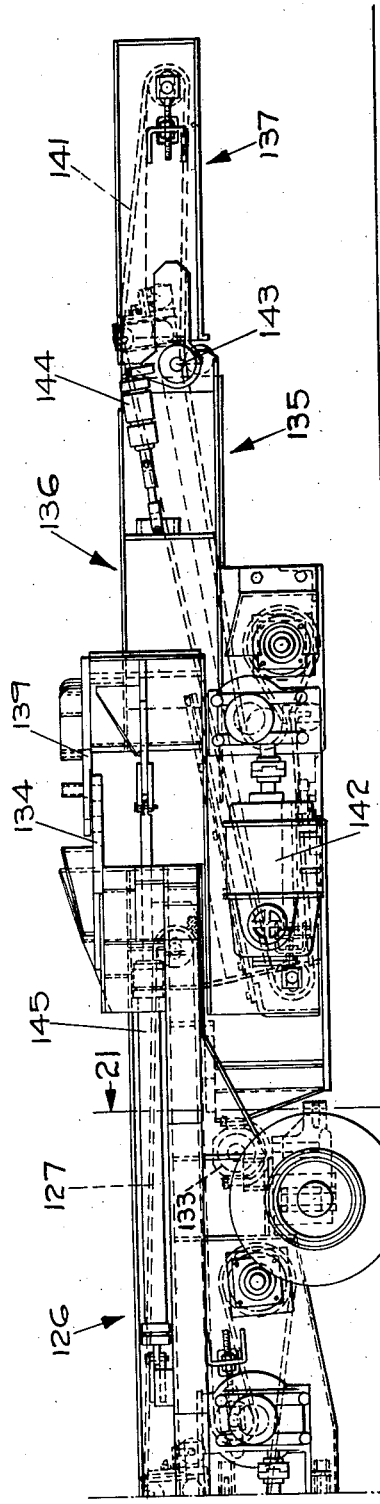
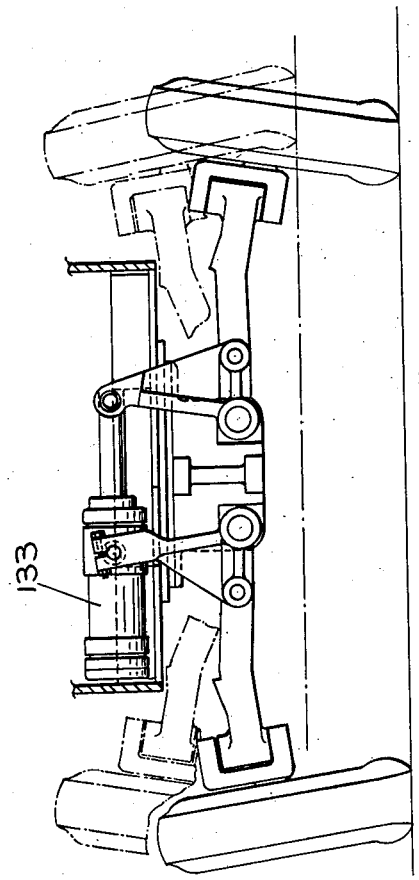
INVENTOR,
STERLING C. MOON,
BY
ATTY.

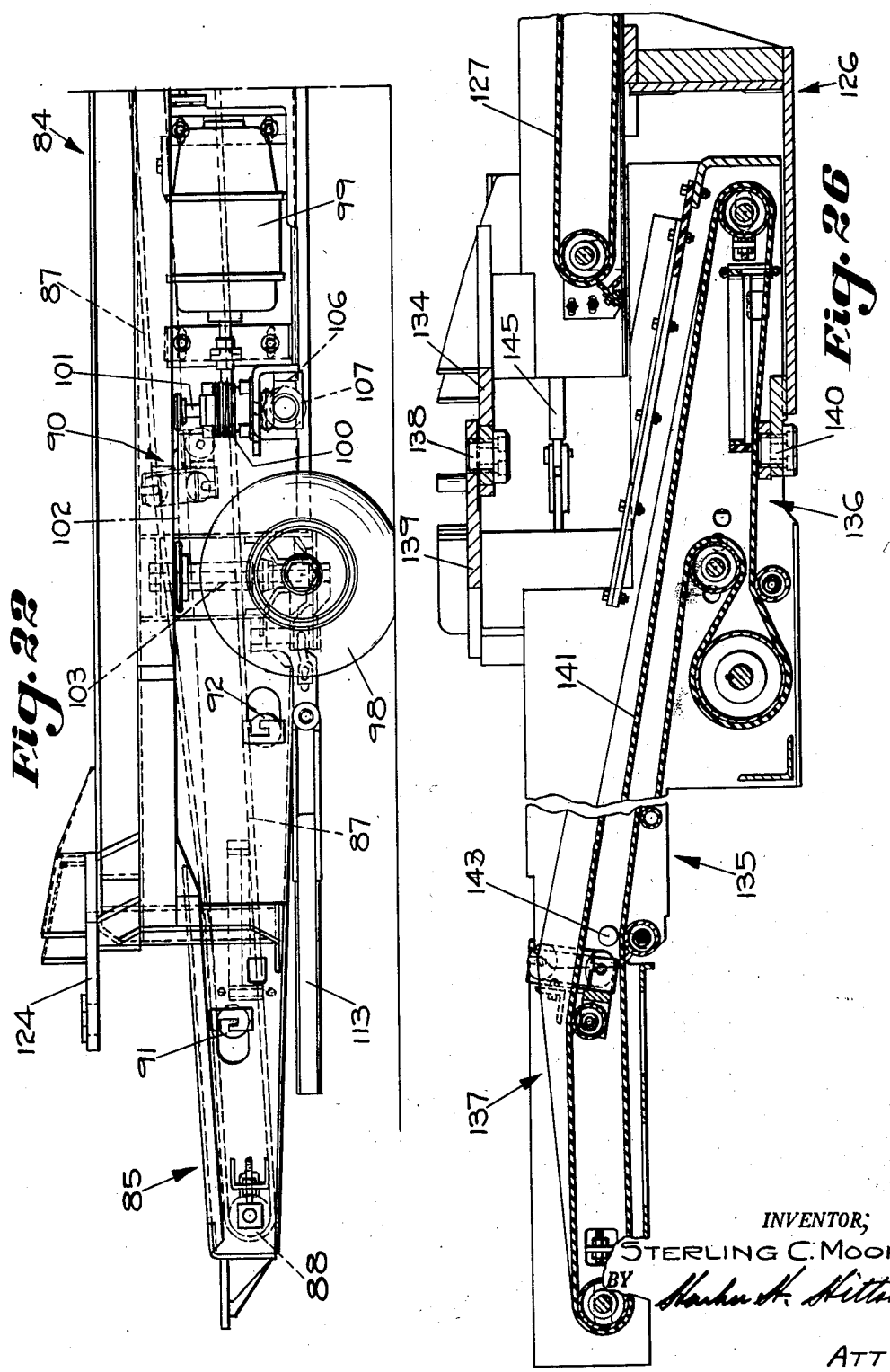

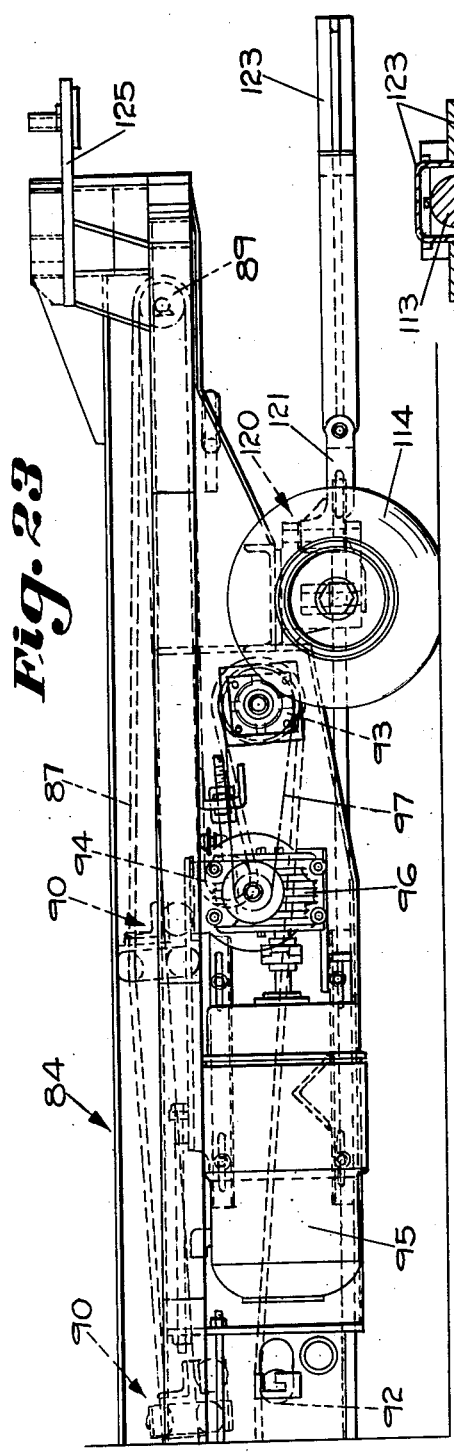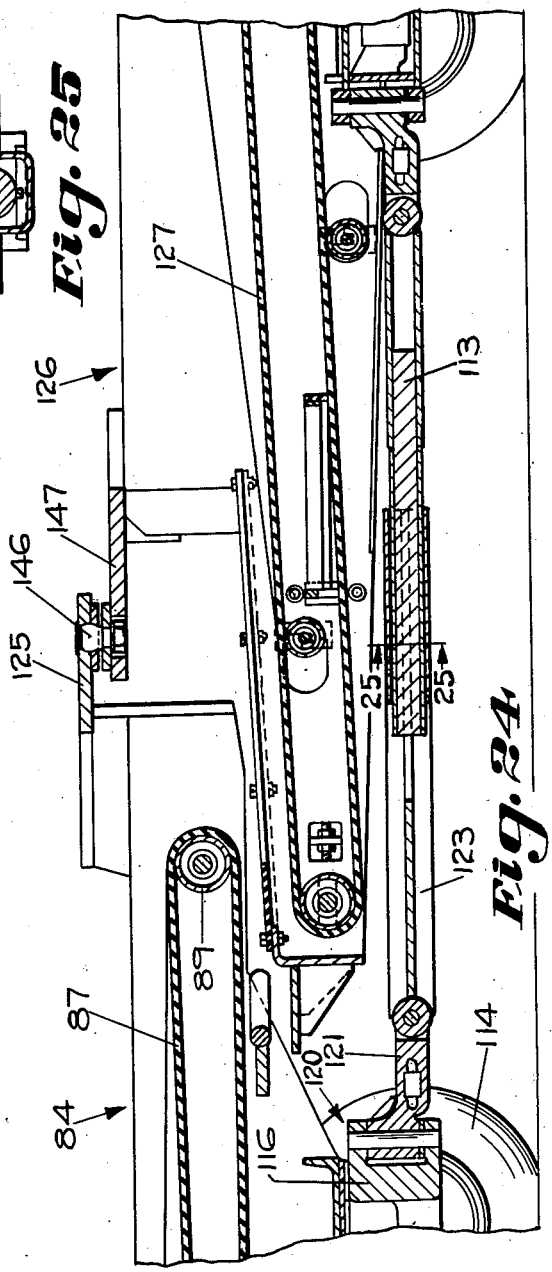

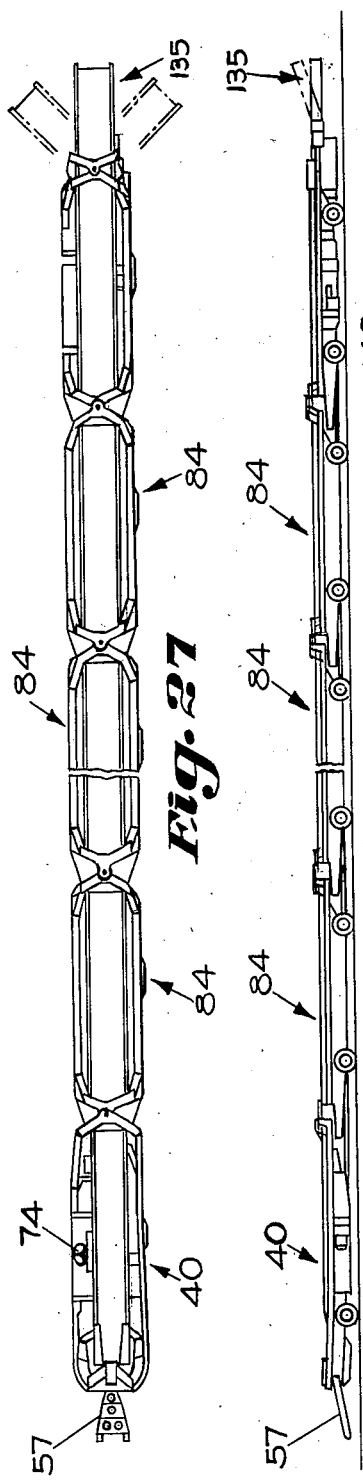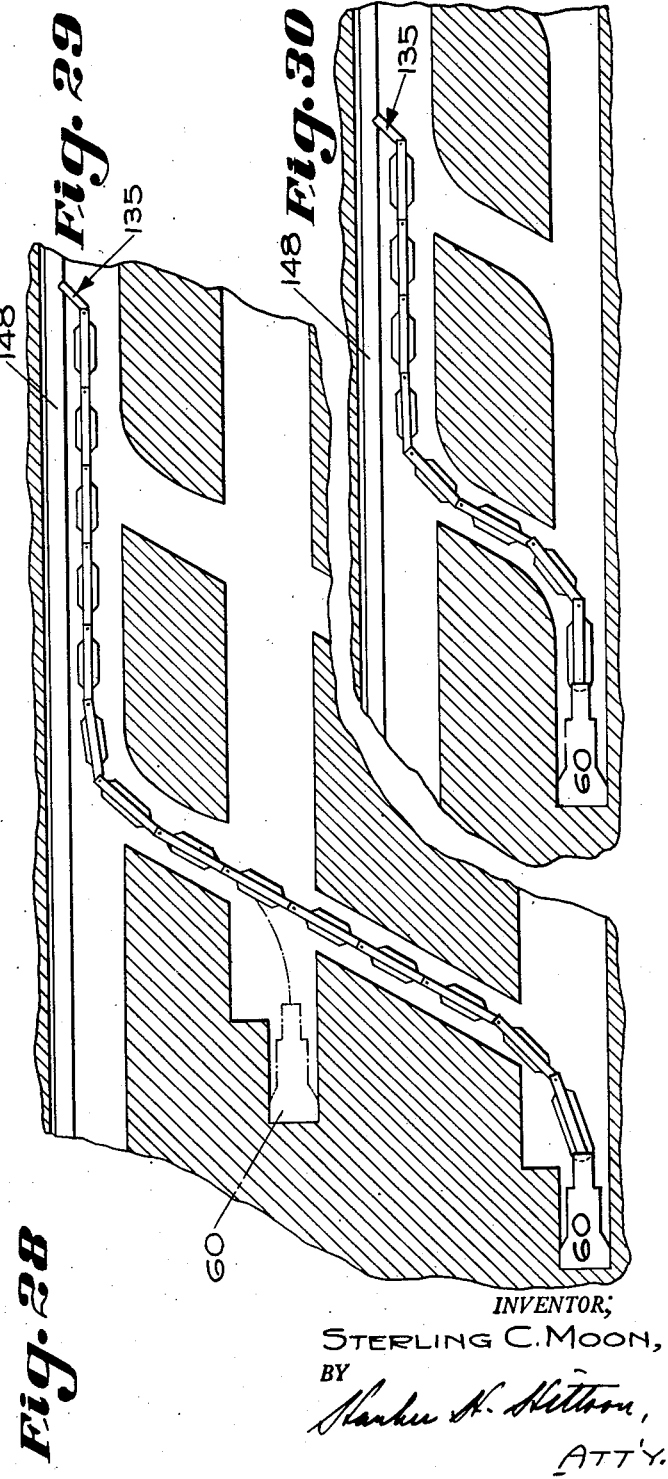

United States Patent Office 2,799,386
Patented July 16, 1957

2,799,386

SELF-CONTAINED MOBILE POWER DRIVEN CONVEYER SYSTEM

Sterling C. Moon, Worthington, Ohio, assignor, by mesne assignments, to The Colmol Company, a corporation of Ohio Application July 21, 1951, Serial No. 237,687

13 Claims. (Cl. 198—92)

This invention relates to a conveyer system which includes a receiving conveyer unit, one or more intermediate conveyer units, and a discharge conveyer unit, all pivotally connected together in tandem relation, one feeding the other.

An object of the invention is to provide improved apparatus of the above mentioned character which is adapted particularly to be connected to and/or receive material from a mining machine, such as a continuous mining machine, and to convey the material, such as coal, without interruption, to a receiving belt conveyer, or the like, the arrangement being such that the continuous mining machine may travel an appreciable distance and be followed by the intermediate conveyer system while discharging at various positions along the length of the receiving conveyer.

In another aspect of the invention it relates to a mining machine, or the like, such as a continuous mining machine, or possibly even a loading machine for mining and/or loading material, such as coal, or the like, the intermediate conveying system being constructed to be attached to or follow closely behind the mining machine which is relatively free to move both longitudinally and laterally, the discharge end of the intermediate conveyer system discharging along at varied positions into a receiving conveyer, or the like.

Still another object of the invention is to provide an improved intermediate transportation or conveyer system for operation between a mining machine, such as a continuous mining machine, or a loading machine, and to deliver the material to any desired receptacle, in which the receiving unit of the intermediate conveyer system and the discharge unit thereof may or may not be power driven but which have steerable wheels, and in which there are steerable wheels on the intermediate unit or units, all such steerable wheels being interconnected and operable in one aspect of the invention from the receiving unit, and in another aspect from the discharge unit, and in still another aspect from both units.

Still a further object of the invention is to provide an intermediate transportation or conveyer system, as above set forth, in which one pair of wheels of the intermediate unit or units are power driven and thus may drive the complete transportation system independent of any mining machine with which it is intended to work.

Still another object of the invention is to provide a transportation or conveyer system including receiving and discharge units and one or more intermediate units, in which power driven traction means is provided on one or more of the intermediate units which are controlled by a hitch on the receiving unit, the hitch being adapted to be connected to a mining machine of the type above mentioned.

Still another object of the invention is to provide a receiving unit of an intermediate transportation system of the general type above mentioned, in which there is a flexible cable hitch extending to the succeeding intermediate unit for controlling the steerable wheels thereof.

Still another object of the invention is to provide an intermediate unit for a conveyer system of the general type above mentioned, in which there are two pairs of interconnected steerable wheels at opposite ends thereof, with hitches connecting each pair of steerable wheels with the preceding and succeeding units of the conveyer system.

Still another object of the invention is to provide a discharge unit for a conveyer system of the above mentioned type, in which there is a discharge boom which is pivotally mounted for swinging movement about an upright axis, and in which there is an independent belt conveyer for the boom, and another belt conveyer for the main body of the unit, and in which the wheels adjacent the discharge boom can be so adjusted as to raise and lower that end of the unit, thereby raising and lowering the discharge boom.

Other objects of the invention will appear hereinafter, the novel features and combinations being set forth in the appended claims.

In the accompanying drawings:

Fig. 1 is an enlarged plan view, looking downwardly, showing the receiving end of the receiving unit of the conveyer system, with the conveyer belt removed and showing also the hitch between said receiving unit and the associated mining machine, such as the continuous mining machine or conveyer;

Fig. 2 constitutes an extension of Fig. 1, and shows particularly the discharge end of the receiving unit;

Figs. 3 and 4, placed end to end, constitute a plan view, looking upwardly, or from below the receiving unit of Figs. 1 and 2;

Figs. 5 and 6, placed end to end, constitute a plan view, looking downwardly, of an intermediate unit of the conveyer system;

Figs. 7 and 9, placed end to end, constitute a plan view, looking upwardly, or from below the intermediate unit of Figs. 5 and 6;

Fig. 8 is a sectional view taken on the line 8—8 of Fig. 7, looking in the direction of the arrows;

Figs. 10 and 11, placed end to end, constitute a plan view, looking downwardly, of the discharge unit of the conveyer system;

Figs. 12 and 13, placed end to end, constitute a plan view, looking upwardly, or from below the discharge unit of Figs. 10 and 11;

Fig. 14 is an elevational view showing the receiving end of the receiving unit of Figs. 1, 2, 3 and 4, attached to the discharge end of a mining machine, such as a continuous mining machine or loader, or the like, with which the intermediate transportation system is adapted to operate;

Figs. 15 and 16, placed end to end, constitute a side elevational view of said receiving unit, with parts shown in section;

Figs. 17 and 18, placed end to end, constitute a side elevational view of the other side of the receiving unit, as compared with Figs. 15 and 16;

Figs. 19 and 20, placed end to end, constitute a side elevational view of the discharge unit shown in Figs. 10, 11, 12 and 13;

Fig. 21 is a sectional view, with parts omitted, taken on the line 21—21 of Fig. 20;

Figs. 22 and 23, placed end to end, constitute a side elevational view of the intermediate section shown in Figs. 5 to 9, inclusive;

Fig. 24 is a sectional elevational view showing the interconnection between an intermediate unit and the discharge unit and it also may represent the interconnection between two intermediate units;

Fig. 25 is a sectional view taken on the line 25—25 of Fig. 24, looking in the direction of the arrows;

Fig. 26 is a sectional elevational view showing particularly the discharge boom and associated belt conveyer of the discharge section;

Fig. 27 is a plan view showing a series of units constituting an intermediate transportation or conveyer system incorporating features of my invention;

Fig. 28 is an elevational view of the conveyer system of Fig. 27;

Fig. 29 is a plan view of the system showing particularly one typical operation in association with a mining machine and a receiving conveyer; and Fig. 30 is a similar illustration of another typical mining operation.

Figure 1:
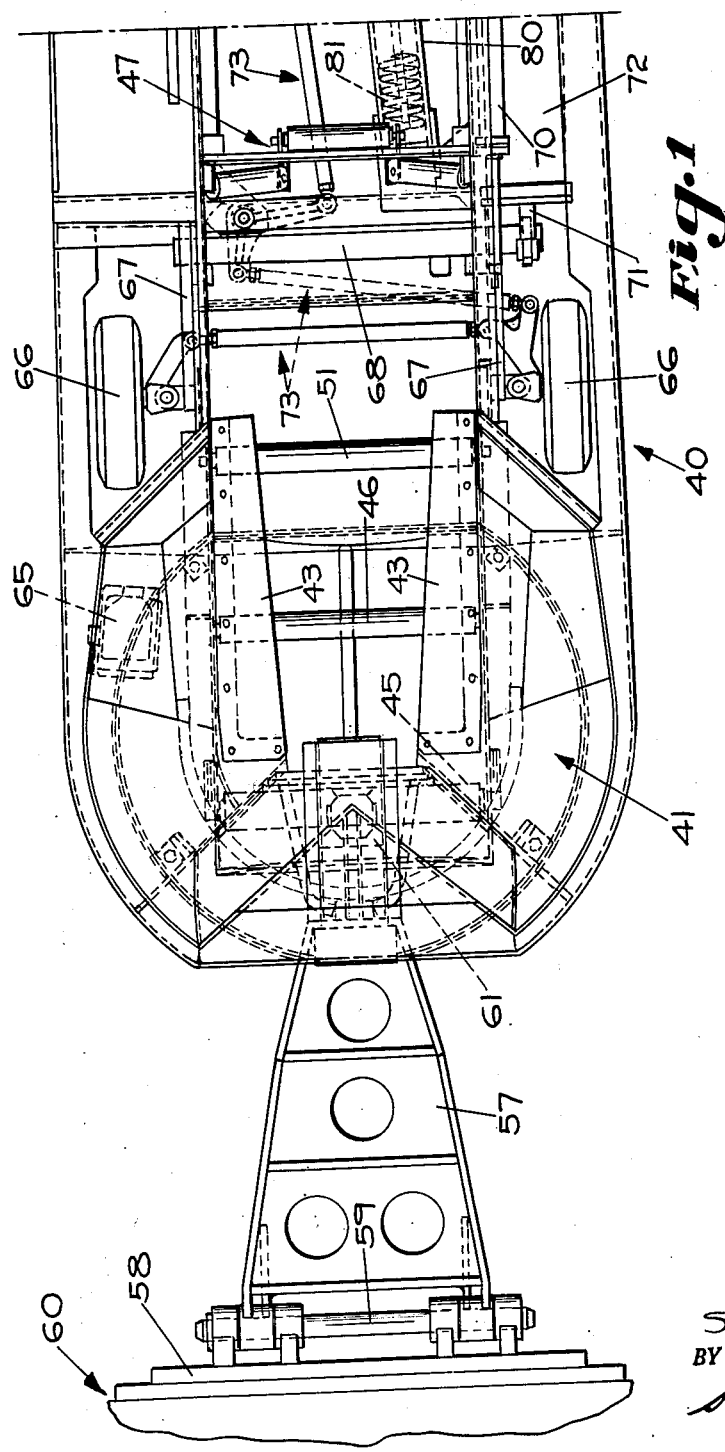

Attention is directed first to the receiving unit illustrated particularly in Figs. 1 to 4, and 14 to 18, inclusive. As clearly illustrated, the receiving unit includes a rather low generally horizontal elongated main frame 40 which is fabricated from longitudinally, transversely and angularly extending channels, angles, plates, and the like, all welded or otherwise rigidly attached together. Adjacent its rear or receiving end the main frame 40 is constructed to form a hopper 41 which is adapted to receive material, such as coal, which discharges over the discharge boom 42 (see Fig. 14) of the associated mining machine, such as a continuous mining machine or loader. The hopper 41 preferably has a wide open bottom which is normally closed by the receiving end of the load carrying run of a continuous rubber fabric belt 44 (see Fig. 15). The somewhat similar conveyer belt for the intermediate unit is illustrated in Figs. 5 and 6 of the drawings. The lateral sides of the bottom of the hopper 41 are provided with longitudinally extending strips 43 (see Fig. 1) of rubber belting, or the like, which overlap the receiving belt an appreciable amount so as to reduce spillage of material from the hopper to a minimum.

The endless rubber belt 44 which conveys material, such as coal, from one end of the frame 40 to the other, and discharges it into the receiving end of the following intermediate unit of the system, extends from a tail pulley 45 (see Figs. 1 and 15) over hopper idler 46 and a plurality of troughing idlers 47 placed at longitudinally spaced positions along the frame 40 to a head or discharge pulley 48. The return run of the belt 44 extends rearwardly from the head pulley 48 around an adjustable take-up and bend pulley 49 (see Figs. 2 and 4), thence forwardly around a drive pulley 50, thence rearwardly over return idlers 51 spaced at appropriate intervals longitudinally along the frame 40.

The drive pulley 50 is driven from an electric motor 52 (see Figs. 2 and 4) which is mounted adjacent one side of the main frame 40 and preferably laterally outside the adjacent main longitudinally extending frame member thereof. Motor 52 is connected to the drive pulley 50 through a speed reducer 53 and appropriate chain and sprocket drive mechanism 54.

Adjacent one side and generally at the center of the main frame 40 there is an operator's station (see Fig. 17) at which there is a control box 55 for controlling the motor 52 as well as also simultaneously controlling all the conveyer belt motors of the entire system. If desired, there may be an auxiliary control box 56 which may be extended to the associated mining machine so that starting and stopping of the conveyer belts of the intermediate system may be there controlled.

Adjacent the rear or receiving end the receiving unit is provided with a hitch 57 which is pivotally attached to the frame of the associated mining machine by a bracket 58 and a transversely extending horizontal pivot pin 59 which provides for swinging movement of the hitch 57 about a transverse horizontal axis relative to the associated mining machine 60; the hitch otherwise being held against movement relative thereto.

At its forward end the hitch 57 is provided with a universal joint 61 (see Fig. 15), which is slidable upon a longitudinally extending generally horizontal pin 62 which is in general alignment with the longitudinal center line or axis of the main frame 40. As a consequence of this connection the forward end of the hitch 57 is connected by a universal joint to the main frame 40 since the pin 60 is rigidly attached to said main frame. Furthermore, there is a limited amount of sliding movement between said universal joint 61 and said pin 62 along the longitudinal axis of the frame 40. The purpose of this will now be described.

The universal joint 61 carries an arm 63 (see Fig. 15) which cooperates with a Bowden wire 64 which is connected to actuate a start and stop electrical control switch 65 (see Fig. 18), which control switch 65 controls the traction motors of some and preferably all of the intermediate units of the conveyer system, thus controlling the starting and stopping of said conveyer system under the tractive effort of the traction wheels of the intermediate units thereof.

With the parts in the positions illustrated in Fig. 15 of the drawings, the switch 65 of Fig. 18 will be shut off, since the receiving unit 40, etc., has advanced the maximum desired amount. As clearly illustrated in Fig. 15 of the drawings, the Bowden wire 64 is associated with the arm 63 through a stop and spring which will allow greater travel of the arm 63 than is required of the switch actuating Bowden wire 64. Should the mining machine 60 move ahead so as to pull the hitch 57 to the left, as viewed in the several figures of the drawings, the universal joint 61 will slide on the pin 62, and the bracket 63 will contact the illustrated stop on the Bowden wire 64 and actuate said Bowden wire 64 to close the switch 65 of Fig. 18, thereby energizing the driving motors for the traction wheels of the conveyor system and causing the complete conveyor system to travel forward until the switch 65 is again opened to de-energize said driving motors.

The conveyer unit 40, etc., is in itself an unstable unit in that it is provided with a pair of supporting wheels at only one end thereof. As clearly illustrated in the drawings, there is a pair of wheels, each designated 66, preferably including pneumatic tires, which wheels are in transverse alignment and adjacent the rear or receiving end of said unit 40, etc. These wheels 66 are mounted for vertical and swinging adjustment relative to the main frame 40, to the end that the receiving end of the unit may be raised and lowered, or, in other words, vertically adjusted to position it at various heights above the ground and relative to the discharge boom 42 of the mining machine. It may also be mentioned that the wheels 66 are mounted for steering adjustment as hereinafter described more completely.

Said steerable wheels 66 are mounted on individual king pins for steering adjustment, the king pins being carried on brackets rigidly attached to rearwardly extending arms 67 (see Figs. 1 and 3). The forward ends of the arms 67 are rigidly attached to a horizontal transversely extending rock shaft 68 carried by appropriate bearings on the main frame 40. At one end the rock shaft 68 is provided with an operating lever arm 69 (see particularly Fig. 15), which lever arm 69 is attached to the piston rod of a hydraulic cylinder 70 carried by the main frame 40 and operable by a manually controlled hydraulic pump 76 (see Fig. 17) to raise and lower the wheels 66 by swinging the arms 67 about the axis of the shaft 68. The arm 69 is also provided with a piston rod 71 (see Fig. 15) which extends into an equalizing cylinder 72 within which there is a heavy coil spring against which the piston carried by the rod 71 abuts. This spring loading mechanism tends to equalize or counterbalance to a large extent the weight of the unit 40 etc., on the wheels 66, thus making it relatively easy for the cylinder 70 to adjust the wheels as above described. The wheels 66 on the unstable or receiving unit are capable of being raised to lower the unit so that it may be readily attached to different mining machines, some of which require this receiving unit to practically scrape on the ground. When the conveyor train is traveling as an independent unit the wheels 66 will be let down to hold the unit at ordinary height.

As above mentioned, the wheels 66 are steerable, and to this end they are provided with the usual steering mechanism 73, best illustrated in Figs. 1 and 3 of the drawings, which steering mechanism includes a conventional manually operable steering wheel 74 (see Figs. 1 and 17).

As hereinafter described more completely, the front end of the unstable conveyer unit 40 etc., is supported from the rear or receiving end of the adjacent intermediate conveyer unit to which it is attached. Consequently the stability of said receiving unit 40, etc., depends upon its attachment to said intermediate unit.

One of the characteristics of the intermediate transportation or conveyer system lies in the fact that the steering of all of the trailing units following the receiving unit 40, etc., is controlled automatically from said receiving unit. To this end, the receiving unit is provided at its front end, which is to the right as viewed in the several figures of the drawings, except Fig. 17, with a steering control hitch 75. The hitch 75 includes a rigid final hitch member in the form of a channel 77 (see Fig. 2) which has a pin receiving bushing 178 at its outer end, which is adapted to receive a pin and be attached to a steering bracket of the adjacent and following intermediate conveyer unit as hereinafter described more completely. The channel 77 is not rigidly attached to the main frame 40 but is flexibly attached thereto by means of a flexible steel cable 78, one end of which is anchored to the channel 77, and the other end of which extends into a tension unit 79 which is attached to the main frame 40. The tension unit 79 includes a cylindrical housing or casing 80 within which there is an elongated helical spring 81 (see Figs. 1 and 2) through which the cable 78 extends.

Figure 2:
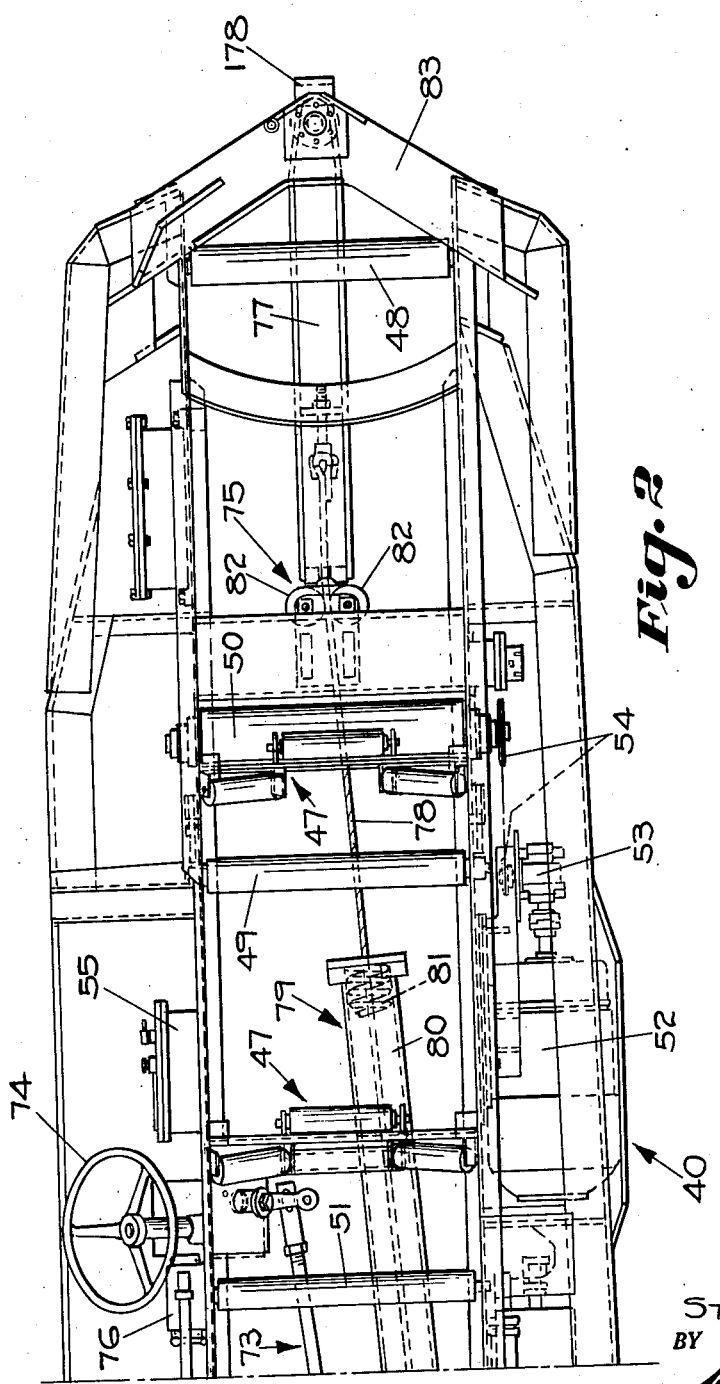
Figure 11:
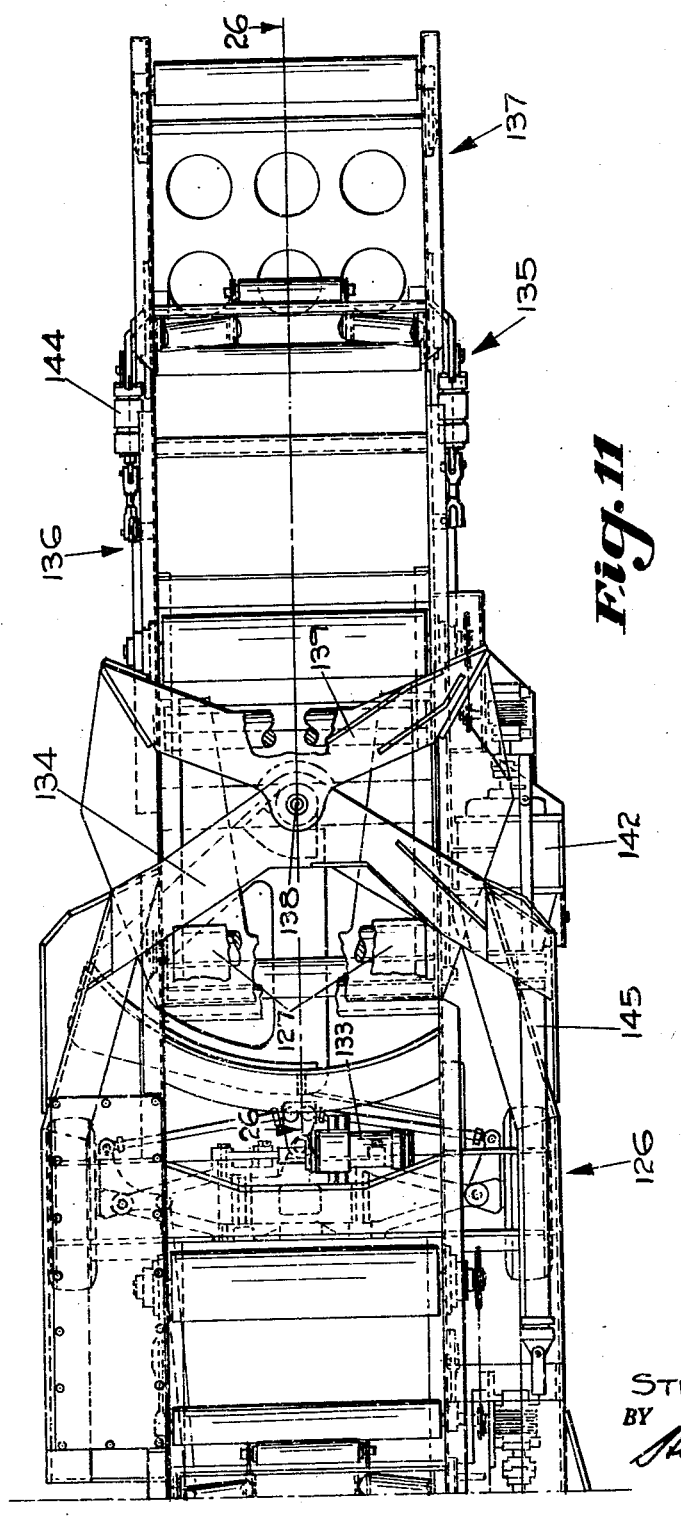

At its left hand end, as viewed in Figs. 1 and 2, the cable 78 is provided with a piston or abutment which abuts the spring 81, said spring 81 tending thereby to urge the cable 78 to the left, as viewed in Figs. 1, 2, 3 and 4. The cable 78 is guided through a pair of guide pulleys 82, and cooperating abutments are provided adjacent the pulleys 82 and on the rear of the channel 77 to prevent said channel from actually contacting and damaging the guide pulleys 82 as the channel 77 is drawn inwardly by the helical spring 81. Channel 77 is in reality a forward section of a steering tongue. It is joined by the horizontal pivot 178 to the casting 112 of the next intermediate unit. It cannot move laterally relative to the casting 112. It must pivot relative to the receiving unit by the flexing of the cable 78 between the pulleys 82.

In Fig. 24 of the drawings there is illustrated, among other things, the manner in which two units of the conveyer system are mechanically coupled together for articulated movement relative to each other particularly about an upright axis along their center lines. The connection also provides a limited amount of universal movement between two interconnected units. The receiving unit 40, etc., is attached to the succeeding intermediate conveyer unit by mechanism similar to that disclosed in said Fig. 24. It will not be specifically described at this time except to point out that at the foremost end, which is the right-hand end as viewed in Figs. 1, 2, 3, 4, 15 and 16, and the left-hand end as viewed in Fig. 17, the main frame 40 includes a V-shaped top cross-piece 83, the apex of which is substantially at the longitudinal center of the unit. This cross-piece 83 is provided adjacent said apex, with at least a portion of the universal joint type coupling connection similar to that hereinafter described in connection with Fig. 24.

Attention is now directed to Figs. 5, 6, 7, 8, 9, and 22 of the drawings and to the construction of one of the intermediate units. It will be understood that there is a minimum of one intermediate unit for each conveyer system. It is further to be understood that the number of intermediate units may be increased from the minimum, as required by any particular installation.

Each intermediate unit includes a main frame 84 which forms a low elongated unit and is fabricated of longitudinal and transverse channels, plates, angles, and the like, all welded or otherwise rigidly attached together. Adjacent its rear, or to the left as viewed in Figs. 5, 7 and 22 of the drawings, the frame forms a shallow receiving hopper 85 which is adapted to receive the material discharged over the head pulley 48 of the receiving unit 40 etc. The rear and two sides of the hopper 85 are provided with a flexible material guide 86 preferably made of rubber belting, or the like, which guides the material onto the upper or load carrying run of an endless rubber belt 87 carried by the unit 84, etc., and extending from the tail pulley 88 to the head pulley 89. The upper or load carrying run of said belt 87 is supported by a plurality of longitudinally spaced troughing idlers 90. There is also a material supporting idler 91 (see Figs. 5, 7 and 22) for supporting the upper run of the belt 87 adjacent the hopper 85.

The return run of the belt 87 is supported on a plurality of return idlers 92 and is reeved about a drive pulley 93 and a combination take-up and bend pulley 94. Drive pulley 93 is driven from an electric motor 95 through a speed reducer 96 and a chain and sprocket drive 97. The motor 95 is mounted on one side of one of the upstanding plates of the main frame 84.

Each of the intermediate units 84, etc., is entirely stable and is power driven and preferably provided with four-wheel steer, the four wheels being interlocked for steering and being controlled by the preceding gathering unit or intermediate unit, as the case may be, and in turn passing the steering control onto the succeeding intermediate or discharge unit, as the case may be. To this end, adjacent the rear or receiving end of the unit there is a pair of power driven or traction steerable wheels 98, each preferably including a pneumatic tire. The wheels 98 are mounted upon king pins for steering adjustment but are held against up and down movement relative to the main frame 84. To provide the power or traction drive to the two wheels 98 a traction electric motor 99 is carried on one side of one of the upright frame members of frame 84 and extends to a speed reducer 100.

As best illustrated in Fig. 22 of the drawings, a drive shaft 101 extends from the speed reducer 100 both upwardly and downwardly, said drive shaft 101 carrying a drive sprocket of a chain and sprocket drive 102 which drives a vertical shaft 103 which in turn drives a bevel gear 104 (see Fig. 8) meshing with a bevel gear 105 rigid with one of the wheels 98. The lower end of the shaft 101 is provided with a bevel gear 106 (Fig. 22) which meshes with another bevel gear 107 which drives a cross shaft 108 (Figs. 5 and 7) provided with appropriate universal joints. The cross shaft 108 drives an upstanding shaft 109 through appropriate spur gears, which shaft 109 is provided at its upper end with a chain and sprocket drive 110 which in turn drives the other wheel 98 through mechanism which is substantially duplicated with that just described in connection with the first wheel 98.

The wheels 98 are mounted for steering movement about the axes of the shafts, similar to shaft 103, and are interconnected for steering adjustment by steering linkage mechanism 111. This steering linkage mechanism 111 includes a bracket or casting 112 (Fig. 7) pivoted about an upright axis to a cross axle of the main frame 84, and which at its rear end is adapted to receive selectively the previously described bushing 178 on the channel 77 of the steering control hitch 75 by means of a removable pivot pin, or to receive a portion 113 of a telescoping hitch which is used to interconnect two adjacent intermediate units or to connect an intermediate unit and the discharge unit.

The front of the unit 84, etc., is supported by a pair of independently spring-suspended wheels 114 preferably provided with pneumatic tires and mounted for steering adjustment in a more or less conventional manner. The suspension mechanism for each of the wheels 114 includes a pivoted arm 115 pivoted at its inner end to a center casting 116 constituting a rigid part of the main frame 84. The outer end of the arm 115 carries the king pin and axle bracket for the wheel.

Extending through a bifurcated portion of each pivoted arm 115 and through a wing of the casting 116 is an individual elongated torsion rod 117 which adjacent its forward end is splined to a keeper arm 118 which is bolted to the pivoted arm 115. It is evident that each torsion rod 117 provides a pivotal connection between a wheel supporting arm 115 and the center casting 116 of the main frame 84. Each of the torsion rods 117 extends rearwardly to the rear cross axle upon which the rear wheels 98 are supported and is splined to a keeper arm 119 bolted to said rear axle. The torsion rods 117 extend through appropriate holes in said rear axle adjacent their splined connection to the keeper arms 119.

The front wheels 114 are provided with steering link mechanism 120 generally similar to the steering link mechanism 111, including a bracket or casting 121 which is preferably a duplicate of the casting 112. The two steering link mechanisms 111 and 120 are preferably coupled together by steering link mechanism 122, said link mechanism 122 causing the wheels 114 to turn oppositely from the wheels 98.

Adjacent the front end of the unit there is a hitch element 123 which is pivotally attached to the bracket or casting 121 and which is complementary to the hitch element 113 and cooperates therewith to extend the steering control from the receiving unit, as above described, through each intermediate unit and ultimately to the discharge unit, as hereinafter described.

The bracket or casting 112 shown in Figs. 5 and 7 and the bracket or casting 121 shown in Figs. 6 and 9 are each pivotally connected through a vertical axis to their respective conveyer supporting units. For the purpose of clarity, each of these brackets or castings are referred to as bars in the claims. The vertical pivotal axis requires these bars 112 and 121 to move only in a horizontal plane. The opposite or outer end of these bars is provided with a pivotal connection disposed in a horizontal axis to which is attached the portion 113, the telescoping hitch and the complementary telescoping hitch element 123 respectively. The hitch elements 113 and 123 are telescoped within one another but cannot have any pivotal movement relative to each other and they function as a single pivotal member between the outer ends of the bars 112 and 121. This structure of the bars 112 and 121 is defined in the claims as two bars pivoted together on a horizontal axis with their opposite ends pivoted on vertical axes to the adjacent conveyer supporting units and has pivoted bar means pivotally connected on horizontal axes to the adjacent ends of hitch elements.

Adjacent its rear end the intermediate unit is provided with a V-type cross piece 124 and adjacent its front end there is a generally similar V type cross-piece 125. The cross-pieces 124 and 125 are complementary, as hereinafter described, to a similar pair of connecting members in connection with an intermediate and discharge unit as seen in Fig. 24 of the drawings. There is a universal joint connection provided as hereinafter described in connection with said Fig. 24, by which the first intermediate unit following the receiving unit is interconnected through the cross-pieces 83 of the receiving unit and 124 of the intermediate unit. Similarly there is a universal connection between the cross-piece or bracket 125 at the forward end of the first intermediate unit and the cross-piece or bracket 124 of the second intermediate unit, if present, or, if not present, between the bracket 125 of the intermediate unit and a similar bracket, hereinafter described, at the rear of the discharge unit.

From the above description it is to be noted that each of the intermediate units is entirely stable, constitutes the support for one end of the unstable receiving unit, is power driven, and thus constitutes at least part of the traction means for the complete conveyer system and is provided with mechanism whereby all of the supporting wheels are steerable, the steering being controlled automatically normally by the receiving unit or, as hereinafter described, possibly by the discharge unit.

Attention is now directed particularly to Figs. 10, 11, 12, 13, 19, 20 and 21 and to the construction of the discharge unit. Except for such differences as are obvious or are pointed out, it is to be understood that the discharge unit is similar to the intermediate unit just described. Without going into too much detail, it may be stated that said discharge unit includes a main frame 126 and is an entirely stable unit, the main frame being supported upon pairs of front and rear interconnected steerable wheels which are attached by the illustrated hitch to the preceding intermediate unit. Said discharge unit is provided with an endless conveyer belt 127 (see Figs. 19 and 20) driven by an electric motor 128 (see Figs. 10 and 12). The driving roller, supporting idlers, etc., of the discharge unit are essentially similar to those of the intermediate unit. It will be noted, however, that, unlike the intermediate unit, none of the wheels of the discharge unit is power driven. Likewise, unlike the intermediate unit, there is a steering control cylinder 129 associated with the interlocking steering mechanism which may be controlled by one of the valves of a bank of hydraulic valves 130 which control various hydraulic motors of the discharge section, as hereinafter described more completely. As illustrated in Figs. 10 and 12 of the drawings, the bank of valves 130 is provided with a plurality of control rods and levers, whereby each valve may be operated from either side of the unit.

The discharge unit also carries an electric motor 131 (see Figs. 10 and 12) driving a hydraulic pump 132 for providing hydraulic fluid to actuate the several adjusting motors on said discharge unit. The discharge unit does not have any torsion rods comparable with the rods 117 of the intermediate unit, but the front wheels are mounted for vertical adjustment by mechanism quite similar to that provided for the intermediate unit. Said front wheels, however, are vertically adjustable about their inward pivot points by means of a double acting hydraulic piston motor 133 (see Fig. 21). The piston rod and cylinder of said motor 133 are connected to opposite ones of the wheel arms of the two front wheels, as clearly illustrated in Fig. 21 of the drawings.

Adjacent its front end the main frame 126 of the discharge unit is provided with a cross-piece 134 which is comparable in structure with the cross-piece 125 of the intermediate section. Extending forwardly from the front of the discharge unit and forming a part thereof is a discharge boom 135 which is formed in two sections, namely, the rear receiving section 136 and a front discharge section 137.

As best illustrated in Fig. 26 of the drawings, the entire discharge boom 135 is mounted for swinging movement about an upright axis relative to the front portion of the body proper of the discharge unit. This swinging connection is provided by top pivot means 138 which pivotally connects the aforementioned cross-piece 134 and a cross-piece 139 forming part of the frame of the rear portion 136 of the boom 135. Adjacent the bottom of the frame of the receiving section 136 there is also a pivot connection 140 which is in alignment with the pivot connection 138. Pivot means 138 and 140 therefore provide for swinging movement of the entire boom 135 about an upright axis along the longitudinal center line of the discharge unit.

Mounted on the two sections 136 and 137 of the boom 135 there is an endless belt 141 which travels over appropriate tail, head, bend and drive pulleys, and is supported by appropriate idlers, all as clearly illustrated in Fig. 26 of the drawings. It is obvious, particularly from said Fig. 26, that the belt 141 will receive material from the belt 127 and discharge it over the head pulley of the boom onto a receiving belt conveyer or any other receptacle, or merely onto the ground.

The receiving section 136 of the boom 135 carries an electric motor 142 which drives the drive pulley thereof through appropriate drive mechanism illustrated particularly in Figs. 13 and 20 of the drawings. As best seen in Fig. 20 of the drawings, the discharge section 137 of the discharge boom 135 is mounted for adjustment on a transverse horizontal axis provided by pivot means 143, this adjustment being controlled by a double acting hydraulic piston motor 144.

Swinging adjustment of the discharge boom 135 about the upright axis of the pivot means 138, 140 is provided by an elongated double acting hydraulic piston motor 145 (see Fig. 20), the cylinder of which is pivoted to the main frame 126, and the piston of which is pivotally attached to an operating arm carried by the frame of the receiving section 136 of the discharge boom 135.

The various hydraulic motors of the discharge unit, including the steering motor 129, the wheel adjusting motor 133, the boom swinging motor 145, and the motor for adjusting the discharge section 137 of the boom 135 are controlled by individual ones of the four hydraulic valves 130. All of these cylinders are double acting and are locked in their normal positions of adjustment. The valve which controls cylinder 129 also has a fourth position in which this cylinder is allowed to float freely to permit control from the other end of the train. This is required, of course, when the steering of the discharge unit is controlled by the adjacent intermediate unit and each succeeding intermediate unit to the steering control unit 75 of the continuous mining machine.

The channel 77 pivots on the cable 78 when the mining machine swings the first conveyor unit or receiving section. This pivotal action starts the casting 112 to swing on its pivot to turn the wheels of the first intermediate unit. The first frame starts to follow the direction of the mining machine causing lateral movement of the wheels by the channel tongue 77, but the next consecutive conveyor unit continues straight because the frame of the first intermediate unit follows its wheels and its tongue 113 is straight until the first wheels of the second unit reach the position of the turning of the rear wheels of the first intermediate section. Then the tongue turns the wheels of the second unit and so on with each unit turning its wheels only when it reaches the same position which is a trailing duplicated pattern.

It is obvious from the above description that the discharge end of the discharge unit may be raised and lowered by controlling the motor 133. In addition, the final discharge pulley, namely, the discharge pulley of the discharge section 137 of the discharge boom 135, may be raised and lowered by the cylinder 144.

Attention is now directed particularly to Figs. 24 and 25 of the drawings where there is illustrated in some detail the overlapping of two adjacent units, which may be either two intermediate units or an intermediate unit and a discharge unit, or, except for the hitch illustrated, may be the receiving unit and the first intermediate unit. In the particular illustration the last intermediate unit is shown discharging into the discharge unit.

As clearly illustrated, the belt 87 of the intermediate unit overlaps the belt 127 of the discharge unit. It is therefore obvious that material being conveyed, such as coal, will drop a relatively short distance from the belt 87 and be received by the belt 127 and carried on to be received by the discharge boom belt 141 from which it will be discharged into a receiving room conveyor, or the like.

The main frames of the intermediate and discharge units are connected together by means of a ball and socket joint or connection 146 which interconnects the cross-piece 125 of the main frame 84 of the intermediate unit with a similar cross-piece 147 at the rear and top of the discharge unit 126 etc. The ball and socket connection 146 provides for relatively articulated or free swinging movement between the two conveying units on an upright axis, and, in addition, provides for limited movement between said two units on horizontal axes. In other words, it is a limited universal joint connection. The steering control is transferred from the intermediate unit to the discharge unit by means of the hitch 123, 113, which two telescoping parts provide for relative longitudinal movement between the two units.

In Figs. 27 and 28 of the drawings there is illustrated a conveyer system made up of a number of units including one receiving unit, one discharge unit, and a plurality of intermediate units. The length of the conveyer system may be adjusted at will by controlling the number of intermediate units.

In Figs. 29 and 30 of the drawings there is illustrated, rather diagrammatically, two different mining operations involving the use of the intermediate conveyer system of my invention in conjunction with a mining machine, such as a continuous mining machine. As here clearly illustrated, the mining machine 60 has a conveyer system attached to it which follows it over a circuitous path through the various entries, break-throughs and rooms, receiving the output from the mining machine and delivering it over the discharge boom 135 on to a main entry or receiving conveyer 148 which may, for example, be an endless belt conveyer in the main haulage entry of the mine.

As clearly illustrated, both in Figs. 29 and 30, the discharge boom is swung laterally to discharge the material on to the conveyer 148. The conveyer system follows along the receiving conveyer 148 and is parallel therewith for a significant distance, then winds through a breakthrough, continuing to the rear end of the mining machine 60. It is evident that the mining machine 60 can proceed in any of the illustrations an appreciable distance from the position illustrated before it will be impossible for the discharge boom 135 to discharge the coal on to the receiving conveyer 148. When that condition is realized, it is only necessary to break the intermediate transportation system and insert any desired number of intermediate units so that any desired portion of the newly formed conveyer system will travel parallel with and adjacent to the receiving conveyer 148.

By virtue of this important link between the continuous mining machine and the main entry or receiving conveyer 148 it is possible for the mining machine 60 to operate in a continuous manner substantially without stopping. Furthermore, it is entirely practical for the mining machine 60 to back up as the traction motors for the intermediate conveyers are reversible and are all controlled from a central control station, as described in the above mentioned application.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A flexible conveyor having at least three interconnected tandem conveyor supporting units including a receiving unit, a discharge unit and at least one intermediate unit, power driven supporting wheel means on the intermediate of said units, supporting wheel means on said discharge unit and on said receiving units, steering means between the adjacent conveyor supporting units in the form of two bars pivoted together on a horizontal axis with their opposite ends pivoted on vertical axes to the adjacent conveyor supporting units, steering rods pivotally connecting said bars with the supporting wheel means of each respective conveyor supporting unit to guide the same when the next leading conveyor unit turns from the path of the following conveyor unit and a universal coupling connecting the adjacent ends of said units independently of said steering means.

2. The structure of claim 1 which also includes steering means interconnecting the supporting wheel means at both ends of each intermediate conveyor unit to allow the trailing wheels to track.

3. The structure of claim 1 which also includes a manual steering control means at the end of the train of conveyor supporting units to guide the train.

4. A flexible conveyor carried on a plurality of wheeled conveyor supporting units connected in tandem to form a train for receiving material at its forward end from a mining machine and discharging it at the other end of the train of conveyor supporting units which comprises complementary universal joint members rigidly mounted on the ends of adjacent conveyor supporting units to provide a swivel joint therebetween, the first of said wheel conveyor units is unstable having retractable wheels at the front and adjacent the mining machine and its other end supported on the next adjacent wheeled conveyor supporting unit.

5. A flexible conveyor carried on a plurality of wheeled conveyor supporting units connected in tandem to form a train for receiving material at its forward end from a mining machine and discharging it at the other end of the train of conveyor supporting units which comprises complementary universal joint members rigidly mounted on the ends of adjacent conveyor supporting units to provide a swivel joint therebetween, steering means between the adjacent conveyor supporting units in the form of two bars pivoted together on a horizontal axis with their opposite ends pivoted on a vertical axis to the adjacent conveyor supporting units, steering rod means pivotally connecting said bars with the supporting wheel means of their respective conveyor supporting unit to guide the same when the next leading conveyor unit turns from the path of the following conveyor unit.

6. A flexible conveyor carried on a plurality of traction powered wheeled conveyor supporting units connected in tandem to form a train for receiving material at its forward end from a mining machine and discharging it at the other end of the train of conveyor supporting units which comprises hitch means on the forward end of the first conveyor supporting unit to connect the train to the mining machine, control means carried by said hitch and actuated by movement of the mining machine to initiate the starting and stopping the traction on the wheeled conveyor supporting units in response to the movement of the mining machine.

7. The structure of claim 6 characterized in that said traction powered units are reversible from a central control station to move them forward and reverse.

8. The structure of claim 6 characterized in that said control means provides limited lost motion in the initiation of the starting and stopping of the wheeled conveyor units.

9. A flexible conveyor having at least three tandem conveyor supporting units, including a receiving unit, a discharge unit and at least one intermediate unit, supporting wheel means on the intermediate of said units, supporting wheel means on said discharge unit, steering supportable wheel means on said receiving unit at its receiving end, steering mechanism connected between the adjacent ends of said units in the form of two bars pivoted together on a horizontal axis with their opposite ends pivoted on vertical axes to the adjacent conveyor supporting units, steering rods pivotally connecting said bars with the supporting wheel means of each respective conveyor supporting unit to guide the same when the next leading conveyor unit turns from the path of the following unit requiring them to move in trailing duplicated pattern when controlled by said steering supporting wheel means, a universal coupling connecting the adjacent ends of said units independently of said wheel means, and means supporting the other end of said receiving unit, through said universal joint from the adjacent intermediate unit.

10. The structure of claim 9 characterized in that said supporting wheel means of said receiving unit has means to retract the same.

11. A flexible conveyor having at least three interconnected tandem conveyor supporting units including a receiving unit, a discharge unit and at least one intermediate unit, supporting wheel means on the intermediate of said units, supporting wheel means on said discharge unit and on said receiving unit, steering mechanism for each of said supporting wheel means, said steering mechanism interconnecting said supporting wheel means of the intermediate and discharge units to require them to move in a trailing duplicated pattern and including hitch elements pivoted on vertical axes to the adjacent ends of said supporting units, and pivot bar means pivotally connected on horizontal axes to the adjacent ends of said hitch elements on said supporting units, and steering rods interconnecting said hitching elements and the wheel means of adjacent units to control the steering of one unit to the next of the conveyor train, and universal coupling means connecting the adjacent ends of said units independent of said steering mechanism.

12. A flexible conveyor having at least three interconnected tandem conveyor supporting units including a receiving unit, a discharge unit and at least one intermediate unit, supporting wheel means on the intermediate of said units, supporting wheel means on said discharge unit and on said receiving unit, steering mechanism for each of said supporting wheel means, said steering mechanism interconnecting said supporting wheel means on said intermediate and discharge units to require them to move in a trailing duplicated pattern and including a pivot bar means flexibly connecting on horizontal axes and interconnecting the wheel means of adjacent units to control the steering of one unit to the next of the conveyor train, said pivot bar means on the receiving unit including a cable attaching the same to said receiving unit.

13. A flexible conveyor having at least three interconnected tandem conveyor supporting units including a receiving unit adapted to be detachably connected and supported on said material supply machine, a discharge unit and at least one intermediate unit, supporting wheel means on the intermediate and discharge units, supporting wheel means on said receiving unit at its receiving end, means to support the other end of the receiving unit from the adjacent intermediate unit, and means to retract said supporting wheel means on said receiving unit when the latter is supported from a supply machine.

References Cited in the file of this patent

UNITED STATES PATENTS

| | | |
|---|---|---|
| 717,163 | Campbell | Dec. 30, 1902 |
| 776,994 | Brennan | Dec. 6, 1904 |
| 1,393,972 | Ronning | Oct. 18, 1921 |
| 1,627,247 | Newdick | May 3, 1927 |
| 1,804,257 | Greenley | May 5, 1931 |
| 1,829,198 | Speer | Oct. 27, 1931 |
| 1,883,054 | Stanley | Oct. 18, 1932 |
| 1,920,500 | Garcia et al. | Aug. 1, 1933 |
| 1,959,457 | Channel | May 22, 1934 |
| 1,980,751 | Dunlop | Nov. 13, 1934 |

(Other references on following page)

UNITED STATES PATENTS

| | | |
|---|---|---|
| 1,990,484 | Harris | Feb. 12, 1935 |
| 2,093,568 | McFarland | Sept. 21, 1937 |
| 2,193,046 | Straus | Mar. 12, 1940 |
| 2,196,659 | Cartlidge | Apr. 9, 1940 |
| 2,313,235 | Grove | Mar. 9, 1943 |
| 2,346,659 | Bruce | Apr. 18, 1944 |
| 2,357,549 | Roberson | Sept. 5, 1944 |
| 2,420,009 | Osgood | May 6, 1947 |
| 2,600,897 | Mathias | June 17, 1952 |

FOREIGN PATENTS

| | | |
|---|---|---|
| 5,102 | France | Oct. 18, 1905 |
| 678,370 | France | Dec. 24, 1929 |
| 654,633 | Germany | Dec. 27, 1937 |